Patented Sept. 21, 1954

2,689,844

UNITED STATES PATENT OFFICE 2,689,844

METHYLOL DERIVATIVES OF POLYMERS OF UREIDOALKYL VINYL ETHERS

Sidney Melamed, Philadelphia, Pa., assignor to Rohm & Haas Company, Philadelphia, Pa., a corporation of Delaware No Drawing. Application April 16, 1952,
Serial No. 282,694

17 Claims. (Cl. 260—72)

This invention deals with methylol derivatives of polyvinyl ureidoalkyl ethers. These derivatives are soluble, reactive resinous materials which are rendered insoluble when heated and which are reactive with materials having reactive hydroxyl groups. The water-soluble products are particularly useful for imparting wet strength to paper. They are useful as adhesives for bonding rubber to fabric and tire cord. They can be used for the stabilization of wool. The hydroxymethyl derivatives may be reacted with alcohols to yield ether derivatives, the simple alcohols yielding the corresponding alkoxymethyl derivatives.

The starting materials from which the derivatives of this invention are made comprise the polymers of ureidoalkyl vinyl ethers described in application Serial No. 282,695, filed on even date in the hands of a common assignee. As there described, ureidoalkyl vinyl ethers of the formula $$CH_2=CHOANRCONH_2$$

A being an alkylene group of two to eighteen carbon atoms and R being hydrogen or a hydrocarbon group, can be polymerized under the influence of free radical catalysts such as azodiisobutyronitrile or dimethyl azodiisobutyrate to give soluble vinyl polymers. When A represents an alkylene group of two to three carbon atoms, the simple polymers are water-soluble unless R contains two or more carbon atoms. The water-soluble polymers form a class of particular interest. Polymers of this class give aqueous solutions which at 50% of polymer have viscosities of V to X or more on the Gardner-Holdt scale.

The polymers may be used as obtained even though they may be accompanied by some amount of monomer. It is likewise unnecessary to fractionate large polymers from dimer or trimer.

As shown in the above-identified patent application, there may be prepared polymers of such ureidoalkyl vinyl ethers as the following:

$CH_2=CH-O-CH_2CH_2NHCONH_2$
$CH_2=CH-O-CH_2CH_2N(CH_3)CONH_2$
$CH_2=CH-O-CH_2CH(CH_3)NHCONH_2$
$CH_2=CH-O-CH_2CH_2CH_2NHCONH_2$
$CH_2=CH-O-CH_2CH_2CH_2CH_2NHCONH_2$
$CH_2=CH-O-(CH_2)_3-C(CH_3)_2NHCONH_2$
$CH_2=CH-O-CH(CH_3)CH_2-C(CH_3)_2NHCONH_2$
$CH_2=CH-O-C(CH_3)_2CH_2CH(CH_3)NHCONH_2$
$CH_2=CH-O-CH_2CH_2CH(CH_3)-C(CH_3)_2NHCONH_2$
$CH_2=CH-O-CH_2-C(CH_3)_2-CH_2NHCONH_2$
$CH_2=CH-O-CH_2CH(CH_3)N(C_6H_4CH_3)CONH_2$
$CH_2=CH-O-CH_2CH_2N(CH_2C_6H_5)CONH_2$
$CH_2=CH-O-CH_2CH_2N(C_6H_5)CONH_2$
$CH_2=CH-O-CH_2CH_2N(C_2H_5)CONH_2$
$CH_2=CH-O-CH_2CH_2N(C_4H_9)CONH_2$
$CH_2=CH-O-CH_2CH_2N(C_6H_{11})CONH_2$
$CH_2=CH-O-CH(C_6H_5)CH_2NHCONH_2$
$CH_2=CH-O-CH_2CH_2-C(CH_3)(C_6H_5)NHCONH_2$
$CH_2=CH-O-CH_2CH_2OCH_2CH_2NHCONH_2$
$CH_2=CH-O-CH_2CH_2OCH_2CH_2N(CH_3)CONH_2$
$CH_2=CH-O-CH_2CH_2SCH_2CH_2NHCONH_2$
$CH_2=CHOCH_2CH(NHCONH_2)C_{16}H_{33}$
$CH_2=CHOCH_2CH_2CH(CH_3)(CH_2)_3C(CH_3)_2NHCONH_2$, etc.

One preferred class of polymers is based on vinoxyalkylureas of the formula $$CH_2=CHO-\underset{R'''}{\overset{R'}{C}}-\underset{R''''}{\overset{R''}{C}}-NHCONH_2$$

where R', R'', R''', or R'''' represent hydrogen or alkyl groups. Also one of these groups may represent a phenyl group. Probably the polymers of greatest present interest are those in which one of these R' groups represents hydrogen or a methyl substituent and the others represent hydrogen.

Any one of the polymers of the above and similar compounds or a mixture of two or more may be reacted with formaldehyde to give methylol derivatives.

Reaction of polymer of a ureidoalkyl vinyl ether is most conveniently effected with aqueous formaldehyde, the 30% to 38% solutions of commerce being generally useful. Revertible polymers of formaldehyde and alcoholic solutions of formaldehyde may also be used. The alcoholic solutions are particularly suitable in reacting solvent soluble polymers.

An aqueous 10% to 60% solution of a water-soluble polymer is desirably taken and mixed with a formaldehyde solution. The pH of such solution and of the reaction mixture should be above 7 and be not over 10 for best results. The temperature of reaction is kept within the range between 20° and 90° C., the most suitable reacting temperatures depending in part upon the pH of the reaction mixture, to concentration of polymer, and the particular polymer. With a pH from 8 to 9.5 polymers from the first members of the series of ureidoalkyl vinyl ethers may be readily reacted between 20° and 50° C. in a reasonable time. With polymers of larger ureidoalkyl vinyl ethers temperatures from 40° to 80° C. are preferred. The reaction is carried on until sufficient of the ureido groups have been reacted and converted to hydroxymethylureido groups to supply the desired reactivity. It is not necessary to so convert every ureido group. Sufficient conversion is ordinarily obtained when 0.6 or more equivalents of formaldehyde are taken per ureido group. A considerable excess of formaldehyde may be mixed with a said polymer, such as 2 to 4 equivalents per ureido group.

It has been observed that while heating of the reaction mixture at pH's outside of the specified range will introduce methylol groups, the compositions may form gels. This has also been noted with excessive temperatures or with prolonged heating in the upper range of reaction temperatures. It must be commented, however, that gels so formed have been homogenized and then used to impart wet strength to paper with excellent results.

It is usually preferred to supply to the reaction mixture an equivalent of formaldehyde per ureido group. Amounts of formaldehyde greater than this are generally useful, however, since they help ensure stability of solutions of the methylol derivatives. Use of a low ratio of formaldehyde may serve under acidic conditions to join two ureido groups together and thus cause cross-linking. Stability is also helped by keeping the pH of solutions near the neutral point and by holding the methylol solutions at low concentrations. For example, a 10% solution was found to be stable for a long time whereas a 50% solution of the same methylol compound gelled when held at 60° C. for several days.

Methylol derivatives of organic solvent soluble polymers are conveniently prepared with formaldehyde in alcoholic solution, solutions in methanol, propanol, or butanol being particularly convenient. Use of alcoholic formaldehyde solutions is often also indicated when it is desired to end up with alkoxymethyl derivatives, the latter conversion being accomplished with the aid of acid as a catalyst, a pH of 3 to 5 being particularly suitable, at a temperature of 50° to 100° C.

For example, a polymer of ureidoisobutyl vinyl ether was treated with a methanolic formaldehyde solution at pH 9. The solution was then acidified to pH 5 with formic acid and heated to reflux. There was formed the methoxymethyl derivative. This was acidified with a little phosphoric acid. Films were formed therefrom and were baked at 125° C. The baked films were hard, glossy, and solvent-resistant.

The butoxymethyl derivative can be formed in the same way. The resulting product gives similar films. The butoxymethyl derivative may also be formed from the methoxymethyl derivative or the ethoxymethyl derivative through transetherification on the acid side. Thus, a 40% aqueous solution of polymer of N-methylvinoxyethylurea was reacted with formaldehyde at pH 8.5 and 45° C. to form the methylol compound. The resulting aqueous solution was diluted with methanol and was acidified with formic acid to pH 5. The mixture was heated under reflux to complete etherification. Butanol was then added along with additional formic acid and methanol was distilled off. The product was a solution of the butoxymethyl derivative. Neutralization of the solution of this product yields a stable composition.

In the same way transetherification can be effected with amyl alcohol, hexyl alcohol, 2-ethylbutyl alcohol, capryl alcohol, n-octyl alcohol, 2-ethylhexyl alcohol, 3,5,5-trimethylhexyl alcohol, and the like. Alkyl substituents up to nine carbon atoms are of primary interest. These alcohols may be summarized by the formula $R_9OH$. For this transetherification temperatures from 50° to 100° C. are generally suitable.

Some illustrative examples of the preparation of methylol derivatives of polymers of ureidoalkyl vinyl ethers follow.

Example 1

A mixture of 20 parts by weight of ureidoethyl vinyl ether and 0.2 part of dimethyl azodiisobutyrate was heated at 75° C. for 16 hours in a pressure apparatus flushed with nitrogen. The resultant viscous liquid consisting of polymer and monomer in about equal amounts was used without purification. The viscous liquid was treated with about 85 parts by weight of a 36% formaldehyde solution in methanol. The pH of the mixture was adjusted to 9.5. It was heated at 50° C. for 20 minutes, cooled, adjusted to a pH of 7, and concentrated by warming under low pressure to give a residue. This residue was a viscous white oil, soluble in water and insoluble in methanol, propanol, and acetone. In the presence of an acidic catalyst the residue set to a rubbery gel.

The above procedure was repeated with a purified polymer of ureidoethyl vinyl ether free of monomer. The product was much like that described above, but the methylol compound obtained was more effective as a wet-strength agent in paper.

Example 2

A mixture of 20 parts by weight of ureidoethyl vinyl ether, 20 parts by weight of water, and 0.2 part by weight of dimethyl azodiisobutyrate was stirred and heated under a nitrogen atmosphere at 75° C. for 16 hours. The viscosity of the solution thus obtained was C on the Gardener-Holdt scale. The solution was poured into 345 parts by weight of acetone. The polymer separated as a precipitate, which was filtered off and dried in vacuo.

A solution of 6.5 parts of this polymer was made in 36 parts of water and thereto was added an aqueous 37% formaldehyde solution in an amount of 12.45 parts. The pH of the resulting mixture was adjusted to a value of 9.0. This mixture was left standing for 16 hours at 25°–30° C. The solution was then found to contain less than one per cent of free formaldehyde, the rest of the formaldehyde having been consumed in forming the methylol derivative of the polymeric ureidoethyl vinyl ether.

The methylol compound prepared as illustrated is converted to alkoxymethyl derivatives by reaction with an alcohol under acidic conditions. For example, a solution of the above methylol product was made in methanol, was acidified with phosphoric acid to a pH of 3.8, and was stirred at 60° C. for an hour. The resulting solution was neutralized with caustic soda solution, filtered with the aid of diatomaceous earth, and concentrated to 47.5% solids. The concentrate was adjusted with butanol to a solids content of 40%. This solution had a Gardner-Holdt viscosity of U+. The product formed as just described was the methoxymethyl derivative of the polymeric ureidoethyl vinyl ether.

A methoxymethyl derivative like that just described was taken up with butanol, adjusted to a pH of 3.5, and heated with removal of methanol. Finally, the solution was stripped at a temperature of 85° C. at a pressure of 100 mm. The resultant solution contained 35.7% of solids and had a viscosity of 0 on the Gardner-Holdt scale.

This resin was compatible with alkyd resins. It was a butoxymethyl derivative of the polymeric ureidoalkyl vinyl ether.

Example 3

There are mixed 35 parts of the polymer of 1-vinoxy-2-ureidooctadecane and 200 parts of ethanol. The mixture is heated and the pH thereof is adjusted with a little potassium hydroxide solution to a value of eight. Thereto is added an ethanolic formaldehyde solution in excess, eight parts of formaldehyde being supplied. The reaction mixture is heated at 60° C. for two hours and then at 80° C. for an hour. There is thus formed the methylol derivative of the above polymer.

This compound is emulsified in water with the aid of 2% of an octylphenoxypolyethoxyethanol. The emulsion is useful for impregnating cellulosic textiles and paper after addition of an acidic catalyst, such as butylphosphoric acid. Impregnated fabric, yarn, or paper is then heated to give a water-proof finish, the cellulose and the methylol compound combining chemically. The above product is also useful for the sizing and finishing of nylon. Nylon fabric is padded through an emulsion thereof containing acid catalyst. The treated fabric is dried and cured at 350°–400° F. The fabric is then water-resistant and has a soft, full hand.

In the same way the polymer of vinyl 5-ureidopentyl ether is converted to the methylol derivative by reaction with a solution of formaldehyde in butanol. This reaction is carried out by heating the reaction mixture at 60°–70° C. at a pH between 7 and 10. The mixture is then adjusted by addition of acid to a pH between 4 and 5 and heated at about 80° C. to form the butoxymethyl derivative. In the presence of an acid catalyst such as oxalic acid or butylphosphoric acid this compound yields tough, flexible solvent resistant films when heated to 120°–150° C. for a short time.

Example 4

There are mixed 60 parts of paraformaldehyde and 600 parts of methanol. The mixture is heated to dissolve the paraformaldehyde and the mixture is brought to a pH close to 10 by addition of a little caustic soda. To this mixture is then added in successive portions N-methyl-N-vinoxyethylurea polymer in an amount of 144 parts. The mixture is maintained at 60°–70° C. for an hour. There is thus formed the methylol derivative of the above polymer.

The reaction mixture is cooled, acidified to pH 5 with formic acid, and heated at 60° C. for one half hour. Additional acid is added to lower the pH to 4.5 and heating is continued for a half hour. The solution is then heated under reduced pressure to remove methanol, the temperature being raised to 80° C. There results a clear, viscous, resinous material, soluble in butanol, xylene, or similar solvents or mixtures thereof. The resin is acidified with butylphosphoric acid to pH 3 and films are formed therefrom. The films are baked at 125° C. for 30 minutes. They are then hard and flexible with good gloss and adhesion.

Example 5

There are mixed 158 parts of the polymer of β-ureidoisobutyl vinyl ether, 60 parts of paraformaldehyde, and 90 parts of butanol. The mixture is adjusted to a pH of 7.5–8.0 and heated at 60° C. for an hour. The mixture is cooled to 45° C. and treated with formic acid to a pH of 4.5. It is heated at 80° C. for an hour. The product is the butoxymethyl derivative of the polymer of ureidoisobutyl vinyl ether dissolved in butanol. It yields films which are cured with an acid catalyst to tough films.

Example 6

The procedure of Example 5 is followed with a mixture of 172 parts of the polymer of 5-ureidopentyl vinyl ether, 60 parts of paraformaldehyde, and 90 parts of butanol. The final product is the butoxymethyl derivative of polymeric ureidopentyl vinyl ether in butanol. Films formed from this solution when an acidic catalyst is present are tough, flexible, and resistant to both oil and water.

In place of the butyl group in the alkoxymethyl compounds there may be used other lower alkyl groups, those of one to four carbon atoms being of first importance, but those of five to eight carbon atoms also being of interest and of value in many types of applications.

The products which are available through the discoveries herein described may be summarized by reference to the basic or repeating units which make up the methylol derivatives of this invention. The repeating units are defined by the formula

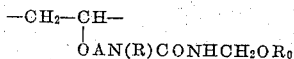

where A is an alkylene chain of two to eighteen carbon atoms, R is hydrogen or a hydrocarbon group of not over about ten carbon atoms, and $R_0$ is hydrogen or an alkyl group, particularly such group up to nine carbon atoms. Where R is hydrogen, a —$CH_2OR_0$ group may be introduced on the intermediate nitrogen atom as well as on the other nitrogen atom.

In the case of products prepared from β-ureidoethyl vinyl ether the repeating units may be summarized by the structure

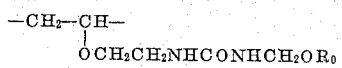

Compounds having alkylene groups of two to three carbon atoms form a class of considerable interest, the methylol derivatives themselves being water-soluble polymers. The comparable alkoxymethyl compounds form another interesting and valuable subgroup. Compounds with four or more carbon atoms in the alkylene group, A, and compounds having hydrocarbon substituents as the group R form yet another natural subdivision, since they are solvent soluble.

The water-soluble methylol and alkoxymethyl substituted polymers are useful as wet strength agents for paper manufacture. They may be mixed with other water-soluble carbamide-formaldehyde condensates to improve the properties thereof, including both urea-formaldehyde and melamine-formaldehyde condensates. Similarly the solvent soluble methylol substituted polymers may be mixed with urea-formaldehyde or melamine-formaldehyde resins of the coatings types, with epoxide resins, with alkyd resins, and the like.

The water-soluble alkoxymethyl substituted polymers may be similarly blended with water-soluble carbamide-formaldehyde condensates. They may be mixed with such water-soluble polymers as polyacrylic acid. Such mixtures when applied as textile sizings and stiffening agents can be insolubilized by heat after application to textile fibers, including nylon. Solvent soluble alkoxymethyl derivatives may be used as coatings or as coreactants with such coating resins as urea-formaldehyde-alcohol condensates, melamine-formaldehyde-alcohol condensates, alkyd resins, epoxide resins, and so on.

I claim:

1. A process for preparing methylol derivatives of polymers of ureidoalkyl vinyl ethers which comprises reacting formaldehyde and a polymer of ureidoalkyl vinyl ether in which the alkyl group has two to eighteen carbon atoms at a pH between 7 and 10 and at a temperature between 20° and 90° C.

2. A process for preparing methylol derivatives of polymers of ureidoalkyl vinyl ethers in which the alkyl group contains two to three carbon atoms which comprises reacting formaldehyde and a said polymer at a pH between 8 and 9.5 and at a temperature between 20° and 50° C.

3. A process for preparing methylol derivatives of polymers of ureidoethyl vinyl ether which comprises reacting in aqueous solution at a pH from 8 to 9.5 and at a temperature between 20° and 50° C. formaldehyde and a said polymer.

4. A process for preparing methylol derivatives of polymers of ureidoalkyl vinyl ethers in which the alkyl group contains four to eighteen carbon atoms which comprises reacting at a pH between 7 and 10 and at a temperature between 40° and 80° C. formaldehyde and a said polymer.

5. The process of claim 4 in which the polymer is a polymer of ureidoisobutyl vinyl ether.

6. The process of claim 4 in which the polymer is a polymer of 5-ureidopentyl vinyl ether.

7. The process of claim 4 in which the polymer is a polymer of 2-ureidooctadecyl vinyl ether.

8. A process for preparing alkoxymethyl derivatives of polymers of ureidoalkyl vinyl ethers in which the alkyl group contains two to eighteen carbon atoms which comprises reacting in a solution at a pH between 7 and 10 and at a temperature between 20° and 90° C. formaldehyde and a said polymer, whereby a resulting solution of a polymer of a hydroxymethyl ureidoalkyl vinyl ether is formed, adjusting the pH of the resulting solution to a value between 3 and 5, and reacting between 50° and 100° C. the polymer of said hydroxymethyl compound with an alcohol $R_0OH$, where $R_0$ is an alkyl group of not over nine carbon atoms.

9. A process for preparing alkoxymethyl derivatives of polymers of ureidoalkyl vinyl ether in which the alkyl group contains two to eighteen carbon atoms, which comprises reacting in solution at a pH between 7 and 10 and at a temperature between 20° and 90° C. formaldehyde and a said polymer, whereby a resulting solution of a polymer of a hydroxymethyl ureidoalkyl vinyl ether is formed, adjusting the pH to a value between 3 and 5, and reacting between 50° and 100° C. the polymer of said hydroxymethyl compound and a saturated aliphatic monohydric alcohol of not over two carbon atoms, whereby an alkoxymethyl derivative is formed, and reacting between 50° and 100° C. said derivative at a said pH with a saturated aliphatic monohydric alcohol, $R_0OH$, where $R_0$ is an alkyl group of four to nine carbon atoms.

10. Polymeric products in which the basic units have the structure

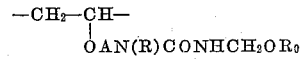

wherein A is an alkylene group of two to eighteen carbon atoms, R is a member of the class consisting of hydrogen and hydrocarbon groups of not over ten carbon atoms, and $R_0$ is a member of the class consisting of hydrogen and alkyl groups of not over nine carbon atoms.

11. Polymeric products in which the basic units have the structure

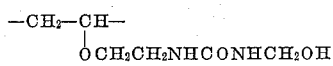

12. Polymeric products in which the basic units have the structure

where $R_0$ is an alkyl group of not over nine carbon atoms.

13. Polymeric products in which the basic units have the structure

in which A is an alkylene group of four to eighteen carbon atoms.

14. Polymeric products in which the basic units have the structure

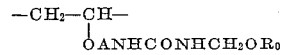

wherein A is an alkylene group of four to eighteen carbon atoms and $R_0$ is an alkyl group of not over nine carbon atoms.

15. Polymeric products in which the basic units have the structure

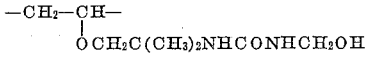

16. Polymeric products in which the basic units have the structure

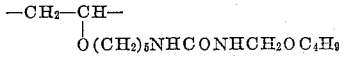

17. Polymeric products in which the basic units have the structure

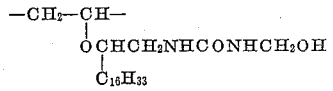

References Cited in the file of this patent

UNITED STATES PATENTS

| Number | Name | Date |
|---|---|---|
| 2,173,005 | Strain | Sept. 12, 1939 |
| 2,412,993 | Larchar | Dec. 24, 1946 |